(12) United States Patent
Williamson, Jr. et al.

(10) Patent No.: US 10,561,971 B2
(45) Date of Patent: Feb. 18, 2020

(54) SOLID-LIQUID SEPARATOR

(71) Applicant: Milieu-Pure Solutions, LLC, Warren, IN (US)

(72) Inventors: Daniel R. Williamson, Jr., Wheaton, IL (US); Jean-Pierre Racine, Granby (CA); Greg Kratzer, Warren, IN (US)

(73) Assignee: Milieu-Pure Solutions, LLC, Warren, IN (US)

( * ) Notice: Subject to any disclaimer, the term of this patent is extended or adjusted under 35 U.S.C. 154(b) by 452 days.

(21) Appl. No.: 15/358,045

(22) Filed: Nov. 21, 2016

(65) Prior Publication Data
US 2017/0144088 A1    May 25, 2017

Related U.S. Application Data

(60) Provisional application No. 62/257,768, filed on Nov. 20, 2015.

(51) Int. Cl.
| | |
|---|---|
| *B01D 33/073* | (2006.01) |
| *B01D 33/11* | (2006.01) |
| *B01D 33/46* | (2006.01) |
| *B01D 33/74* | (2006.01) |
| *B01D 33/76* | (2006.01) |
| *B01D 33/80* | (2006.01) |
| *B01D 33/72* | (2006.01) |

(52) U.S. Cl.
CPC ............ *B01D 33/073* (2013.01); *B01D 33/11* (2013.01); *B01D 33/466* (2013.01); *B01D 33/74* (2013.01); *B01D 33/76* (2013.01); *B01D 33/801* (2013.01); *B01D 33/72* (2013.01)

(58) Field of Classification Search
CPC ...... B01D 33/11; B01D 33/76; B01D 33/801; B01D 33/073; B01D 33/506; B01D 29/118; B01D 29/94; B01D 29/90; B01D 29/6476; B01D 29/35; B01D 29/356; B01D 29/828; B01D 29/6415; B01D 29/46; B01D 29/52; B01D 29/66; B01D 35/26; B01D 2201/02; B01D 2201/287; B01D 2201/12; B01D 2201/282; B01D 33/466; B01D 33/72; B01D 33/74; B04B 1/00; B04B 15/06; A01C 3/00
See application file for complete search history.

(56) References Cited

U.S. PATENT DOCUMENTS

| | | | | |
|---|---|---|---|---|
| 1,962,461 | A  * | 6/1934 | Piper | F16H 1/46 475/332 |
| 6,187,180 | B1 * | 2/2001 | Bruke | B01D 21/0003 210/116 |
| 10,179,301 | B2 * | 1/2019 | Bechtl | B01D 29/35 |

* cited by examiner

*Primary Examiner* — Benjamin L Lebron

(57) ABSTRACT

A solid-liquid separator for separating a solid phase from a liquid phase in a solid-liquid mixture is provided. The solid-liquid separator includes a basket and filter assembly housed coaxially within a tank such that when the basket and filter assembly rotates the liquid phase moves through the filter of the basket and filter assembly into the tank and is discharged from the solid-liquid separator. The solid phase is retained on the filter of the basket and filter assembly and travels vertically up the filter of the basket and filter assembly where it is discharged from the solid-liquid separator.

19 Claims, 5 Drawing Sheets

SOLID-LIQUID SEPARATOR

The present application is a nonprovisional patent application, which claims priority to U.S. Provisional Patent Application Ser. No. 62/257,768, filed Nov. 20, 2015, and having the title "SOLID-LIQUID SEPARATOR," which is herein incorporated in its entirety.

TECHNICAL FIELD OF THE DISCLOSED EMBODIMENTS

The embodiments herein generally relate to solid-liquid separation and, more particularly, to solid-liquid separation of manure.

BACKGROUND OF THE DISCLOSED EMBODIMENTS

The separation of a solid phase from a liquid phase in a solid-liquid mixture is a challenging task that is relevant to many industries including wastewater, drinking water, pharmaceutical, chemical, food, agriculture, and mining. Thorough and efficient solid-liquid separation is essential, especially considering the high cost of solids disposal for many industries. Solid-liquid separation can be achieved by chemical or physical processes or, more typically, a combination of both. In many applications, the solid-liquid separation process involves pretreatment, solids concentration, solids separation, and post-treatment. Generally, solid-liquid separation is achieved by two different separation methods, namely sedimentation or filtration. Sedimentation techniques rely on the different densities of the solid and liquid phases to accomplish separation. Principally, sedimentation techniques include gravity, centrifugal, electrostatic, and magnetic. On the other hand, filtration methods involve a medium, e.g., a screen or membrane, which retains the solid phase while allowing the liquid phase to pass through the medium. Filtration can be achieved by pressure, vacuum, centrifugal, or gravity operations.

Chemical pretreatment is used to enhance separation of the solid and liquid phases through coagulation or flocculation. However, the addition of chemicals may reduce the suitability of the separated solid phase for land application. For example, many sedimentation systems utilize gravity because this process is relatively simple and inexpensive. However, the operation of gravity alone leads to extremely long settling times. Therefore, chemical pretreatment is necessary to coagulate solids and increase the rate of sedimentation. Unfortunately, the addition of chemicals can reduce the usefulness and desirability of the separated solid phase for land application or other beneficial reuses.

Furthermore, cost effective solid-liquid separation technologies are essential for economical separation of the solid and liquid phases. These technologies are required to operate reliably while providing low installation, operating, and maintenance costs. Nevertheless, many technologies do not satisfy these requirements and instead demand high operating and maintenance costs.

In animal agriculture, producers seek alternative treatments and processing technologies for liquid manure to reduce excessive nutrient loading and odor potential of liquid manure storage structures. Liquid manure systems are popular with livestock operations because the manure is easier to handle, store, and biologically treat. Furthermore, the manure pits and gutters are also easy to recharge and flush using lagoon liquid.

Solid-liquid separation of liquid manure results in liquids that are easier to pump and handle. Additionally, the process helps to reduce the amount of organic material in treatment lagoons, odors in storage and treatment facilities, solids build-up in primary lagoons, frequency of lagoon sludge removal, and potential surface water and groundwater pollution. Beneficial uses of the recovered solids include bedding materials, animal feed supplements, composts, and soil amendments.

Known methods and devices for solid-liquid separation of animal manure are laborious and inefficient, with high operating costs. Furthermore, demands for product purity and environmental acceptability of waste materials necessitate solid-liquid separation techniques that can meet these requirements. Therefore, a need exists to provide an easy to operate and efficient solid-liquid separator for separating solids from liquids in a solid-liquid mixture. This solid-liquid separator would also enable the operator to easily adjust the machine according to the solids content of the solid-liquid mixture. A need further remains for a solid-liquid separator of simple construction particularly adapted for processing manure and other types of wastes.

SUMMARY OF THE DISCLOSED EMBODIMENTS

In one embodiment, a solid-liquid separator for separating a solid phase from a liquid phase in a solid-liquid mixture is provided. The solid-liquid separator comprises a leg and tank assembly wherein the legs connect to and support a tank. The tank comprises a side wall and bottom wall that form a vessel for collecting the separated liquid phase. In one embodiment, a basket and filter assembly is coaxially housed within the tank. The basket and filter assembly comprises a filter and bottom wall. In one embodiment, the basket and filter assembly provides for filtration of a solid-liquid mixture through the filtration means of the filter. In another embodiment, filtration is achieved by a filter comprising a membrane liner and filter. It should be understood that the gauge of filter may vary depending on the application and the nature of the solid-liquid mixture.

In one embodiment, the leg and tank assembly connects to a spindle assembly comprising nested shafts. The spindle assembly provides for rotation of the basket and filter assembly about an upright axis. With this rotation, centrifugal force causes the solid-liquid mixture to migrate away from the axis of rotation. In a further embodiment, the nested shafts of the spindle assembly provide for rotation of a wiper assembly about the upright axis, separately from the basket and filter assembly. The wiper assembly includes wiper blades that promote movement of the solid-liquid mixture toward the side wall of the basket and filter assembly to allow for filtration of the mixture. In one embodiment, the wiper blades facilitate movement of the solid phase vertically up the filter of the basket and filter assembly and the liquid phase through the filter into the tank.

In another embodiment, the liquid phase enters the void space between the tank and the basket and filter assembly and exits the solid-liquid separator through a primary liquid discharge outlet. In one embodiment, the primary liquid discharge outlet is generally horizontal and located near the bottom of the tank, extending exterior to the side wall. In another embodiment, a secondary liquid discharge outlet is located above the primary liquid discharge outlet, extending exterior to the side wall of the tank. This secondary liquid discharge outlet is initially horizontal and then bends 90 degrees downward to connect with the primary liquid discharge outlet. The purpose of the secondary discharge outlet is to provide another exit route for the separated liquid phase and also to equalize the pressure in the solid-liquid separator.

In a further embodiment, a contour tank surrounds and merges with the upper end of the tank. This contour tank allows for the accumulation and discharge of solids through a solid discharge outlet. The solid discharge outlet extends exterior to the wall of the contour tank. In one embodiment, the wiper blades of the wiper assembly facilitate movement of the solid phase vertically up the filter of the filter and basket assembly into the area enclosed by the contour tank. In another embodiment, the top of the basket and filter assembly includes scrapers located in the area enclosed by the contour tank to push solids toward the solid discharge outlet.

In one embodiment, the upper end of the contour tank is sealed by a tank cover assembly. The tank cover assembly comprises a vent cover assembly, tank cover, and adaptor cover. In another embodiment, the vent cover assembly permits infiltration of air into the solid-liquid separator through air vents that align with cutouts in the tank cover. Rotation of the vent cover assembly relative to the tank cover allows for adjustment of the air vents along a continuum between fully open and closed positions. In another embodiment, the vent cover assembly may be opened to provide access to the interior of the solid-liquid separator through an opening in the tank cover. In a further embodiment, heated air is forced into the air vents to assist with drying of the separated solid phase.

In another embodiment, the void space between the tank and basket and filter assembly is sealed at the top to prevent solids that move vertically up the filter of the basket and filter assembly from entering this void space where liquid accumulates before exiting the solid-liquid separator.

In one embodiment, the solid-liquid mixture enters the shaft of the wiper assembly through an inlet located at the top of the tank cover assembly. The solid-liquid mixture travels vertically down the length of the shaft and exits via a port at the base of the shaft near the bottom wall of the basket and filter assembly. In a further embodiment, an elongated cone is located near the base of the shaft but above the exit port where the solid-liquid mixture enters the basket and filter assembly. This cone directs the solid-liquid mixture along the bottom wall of the basket and filter assembly toward the filter.

In another embodiment, a motor is mounted to the solid-liquid separator and provides power to the spindle assembly in order to drive the separate rotation of the basket and filter assembly and the wiper assembly. In one embodiment, the motor drives two separate belts, with each belt controlling one of the nested shafts of the spindle assembly.

In one embodiment, the operation of the solid-liquid separator can be changed based on the percent solids content of the solid-liquid mixture. For solid-liquid mixtures with high percent solids content, the wiper assembly rotates at a higher rate than the basket and filter assembly for faster movement of the solids upward along the filter. For solid-liquid mixtures with low percent solids content, the wiper assembly rotates at a lower rate than the basket and filter assembly and the angle of the wiper blades is reversed to provide additional time for the solids to dry before moving upward along the filter.

In a further embodiment, two or more basket and filter assemblies are coaxially configured and housed within the tank. In one embodiment, the outer basket and filter assembly comprises a finer gauge filter than the inner basket and filter assembly. In another embodiment, wiper blades are attached to the outer surface of the filter of the inner basket and filter assembly to facilitate the movement of the liquid phase filtered through the inner filter toward the outer basket and filter assembly. It should be understood that the basket and filter assembly can be of any shape and that the two or more coaxially configured basket and filter assemblies need not be of the same shape.

Other embodiments are also disclosed.

BRIEF DESCRIPTION OF DRAWINGS

The embodiments described herein and other features, advantages and disclosures contained herein, and the manner of attaining them, will become apparent and the present disclosure will be better understood by reference to the following description of various exemplary embodiments of the present disclosure taken in conjunction with the accompanying drawing, wherein.

DETAILED DESCRIPTION OF THE DISCLOSED EMBODIMENTS

Figure 1:
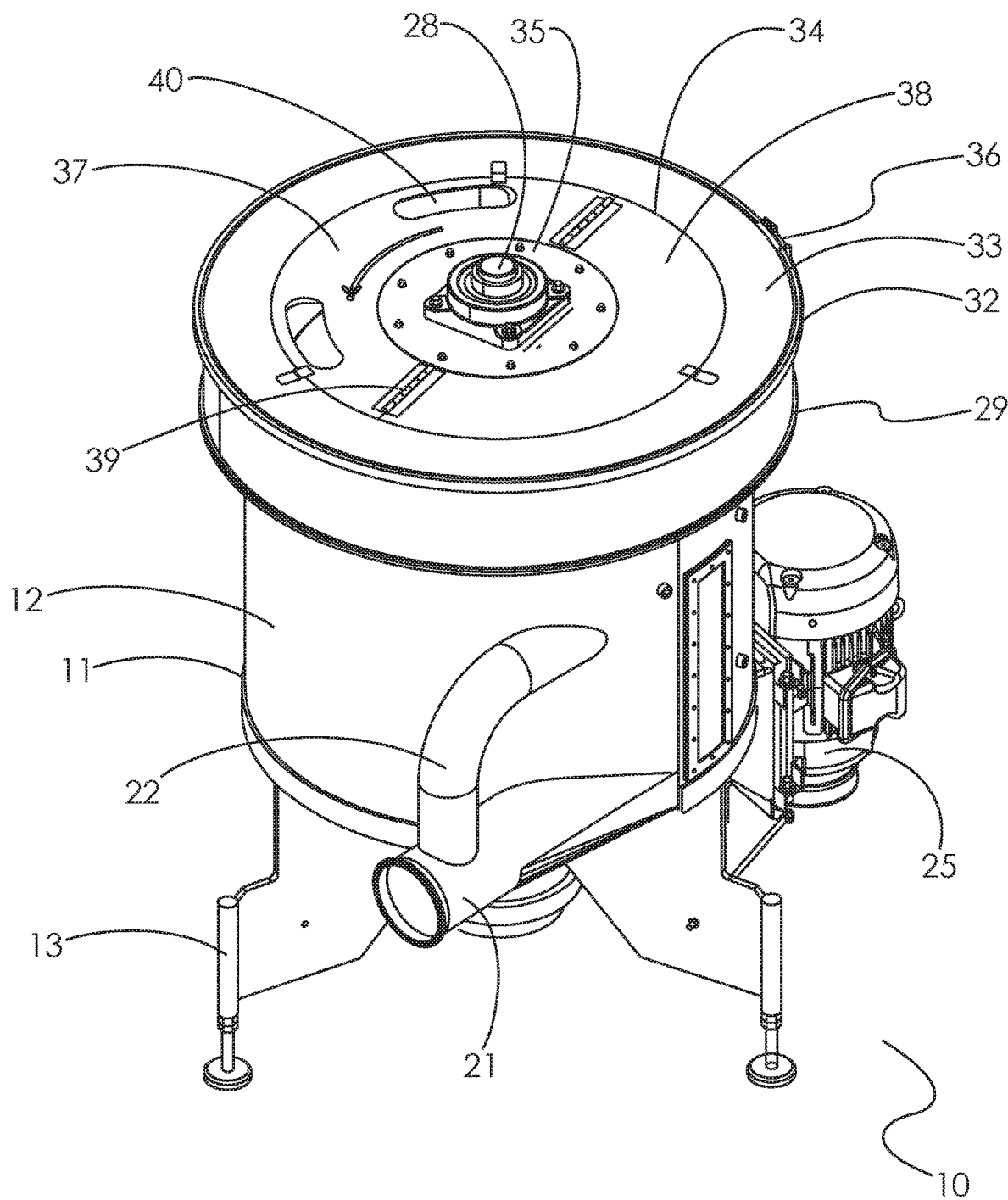
FIG. 1 is a side perspective view of a solid-liquid separator in accordance with an embodiment.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

Figure 2:
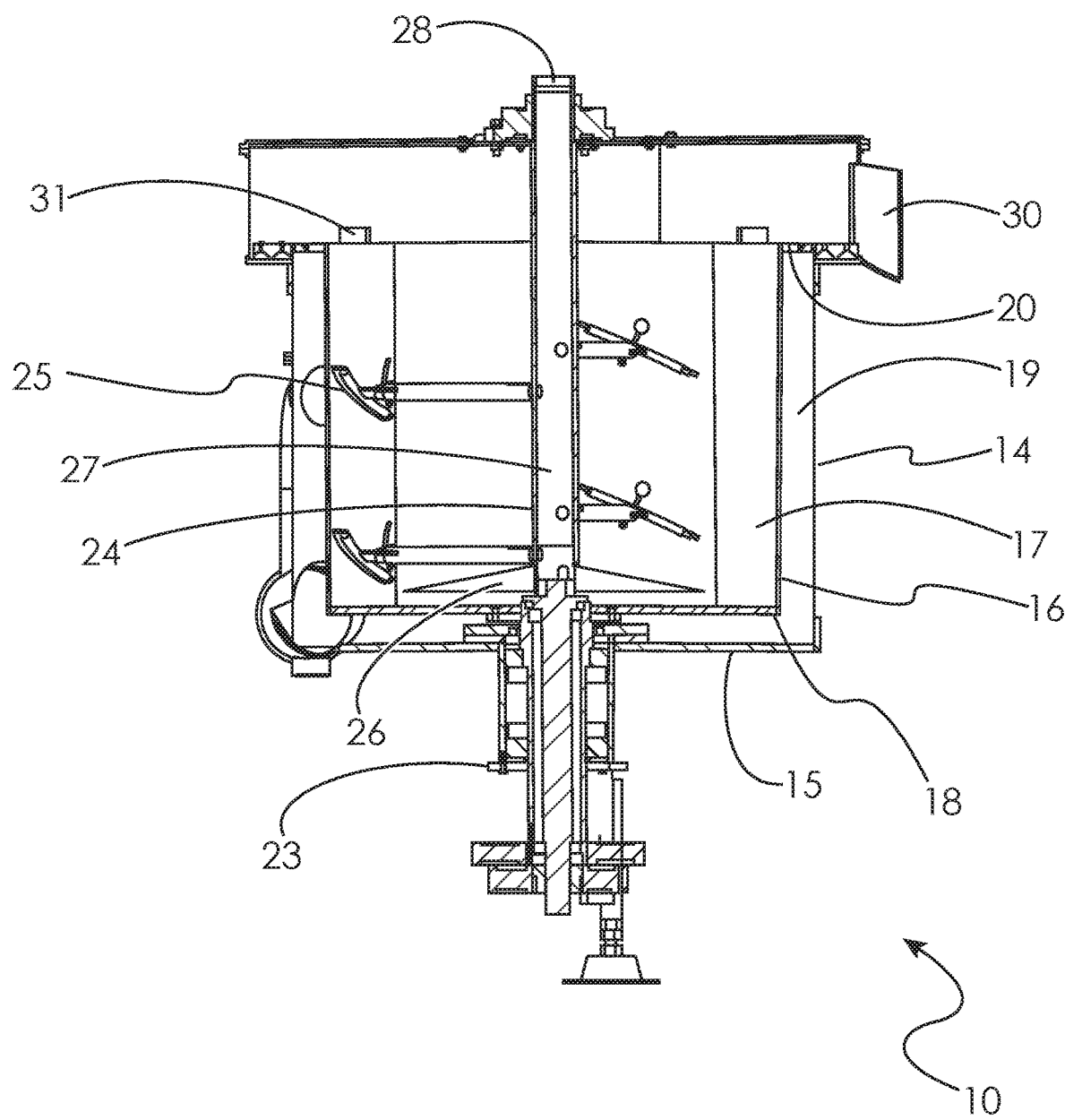
FIG. 2 is a vertical cross-section of a solid-liquid separator in accordance with an embodiment.
Figure 3:
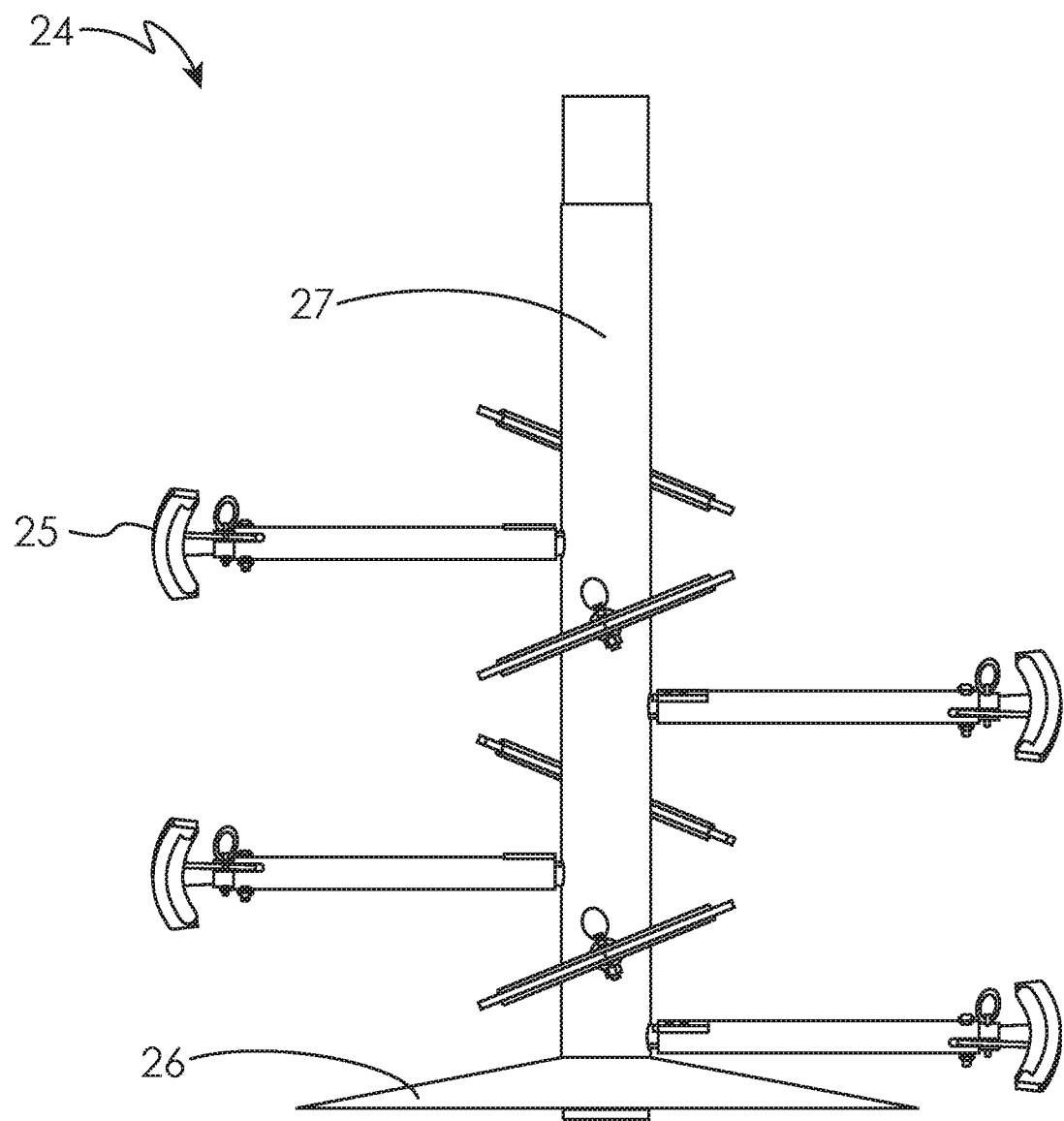
FIG. 3 is a magnified view of a wiper assembly in accordance with an embodiment.

With reference to FIGS. 1-3, the solid-liquid separator 10 of the invention comprises a leg and tank assembly 11, basket and filter assembly 16, spindle assembly 23, wiper assembly 24, contour tank 29, and tank cover assembly 32. The leg and tank assembly 11 comprises a tank 12 and legs 13, with the tank 12 being connected to and supported by the legs 13. In some embodiments, the legs 13 are not present. The tank 12 comprises a side wall 14 and bottom wall 15, which together form a collection vessel for the separated liquid phase. In the illustrated embodiment, the tank 12 is cylindrical; however, other embodiments may employ other shapes, such as conical or frustoconical, to name just two non-limiting examples.

The basket and filter assembly 16 is housed coaxially within the tank 12. The basket and filter assembly 16 comprises a filter 17 and bottom wall 18. The filter 17 permits filtration of the solid-liquid mixture through the filter. Filtration may be assisted by a membrane liner (not shown), which may be located on the interior of the filter 17 in an embodiment. The filter and membrane liner of the filter 17 allow most of the liquid phase to pass through but retain most of the solids inside the basket and filter assembly 16. It should be understood that various filtration means may alternatively or additionally be provided as part of the filter 17 to alter the degree of filtration in accordance with the application.

The arrangement of the basket and filter assembly 16 coaxially within the tank 12 creates a void space 19 between the filter 17 and bottom wall 18 of the basket and filter assembly 16 and the side wall 14 and bottom wall 15 of the tank 12. The void space 19 created between the tank 12 and the basket and filter assembly 16 is sealed at the top by covers 20. The covers 20 prevent accumulated solids at the top of the basket and filter assembly 16 from entering the void space 19, where separated liquid phase collects prior to exiting the solid-liquid separator 10. A primary liquid discharge outlet 21 and secondary discharge outlet 22 extend exterior to the side wall 14 and allow for discharge of the liquid phase from the void space 19.

The legs 13 may be further connected to the spindle assembly 23, which is centrally located on the exterior of the bottom wall 15 of the tank 12. The top portion of the spindle assembly 23 extends into the tank 12 through the bottom wall 15 and into the basket and filter assembly 16 through the bottom wall 18. The spindle assembly 23 comprises two nested shafts with one shaft controlling the rotation of the basket and filter assembly 16 and the other shaft separately controlling the rotation of the wiper assembly 24. The nested shafts of the spindle assembly 23 allow for the basket and filter assembly 16 and wiper assembly 24 to rotate at different speeds based on the percent solids content of the solid-liquid mixture. The basket and filter assembly 16 and wiper assembly 24 are driven into rotation about a vertical axis by the means of a motor 25 secured to the solid-liquid separator 10. The centrifugal force generated by the rotation of the basket and filter assembly 16 forces the solid-liquid mixture toward the filter 17. The liquid phase is forced through the membrane liner and filter of the filter 17 into the void space 19, where it is discharged through either primary liquid discharge outlet 21 or secondary discharge outlet 22.

Figure 5:
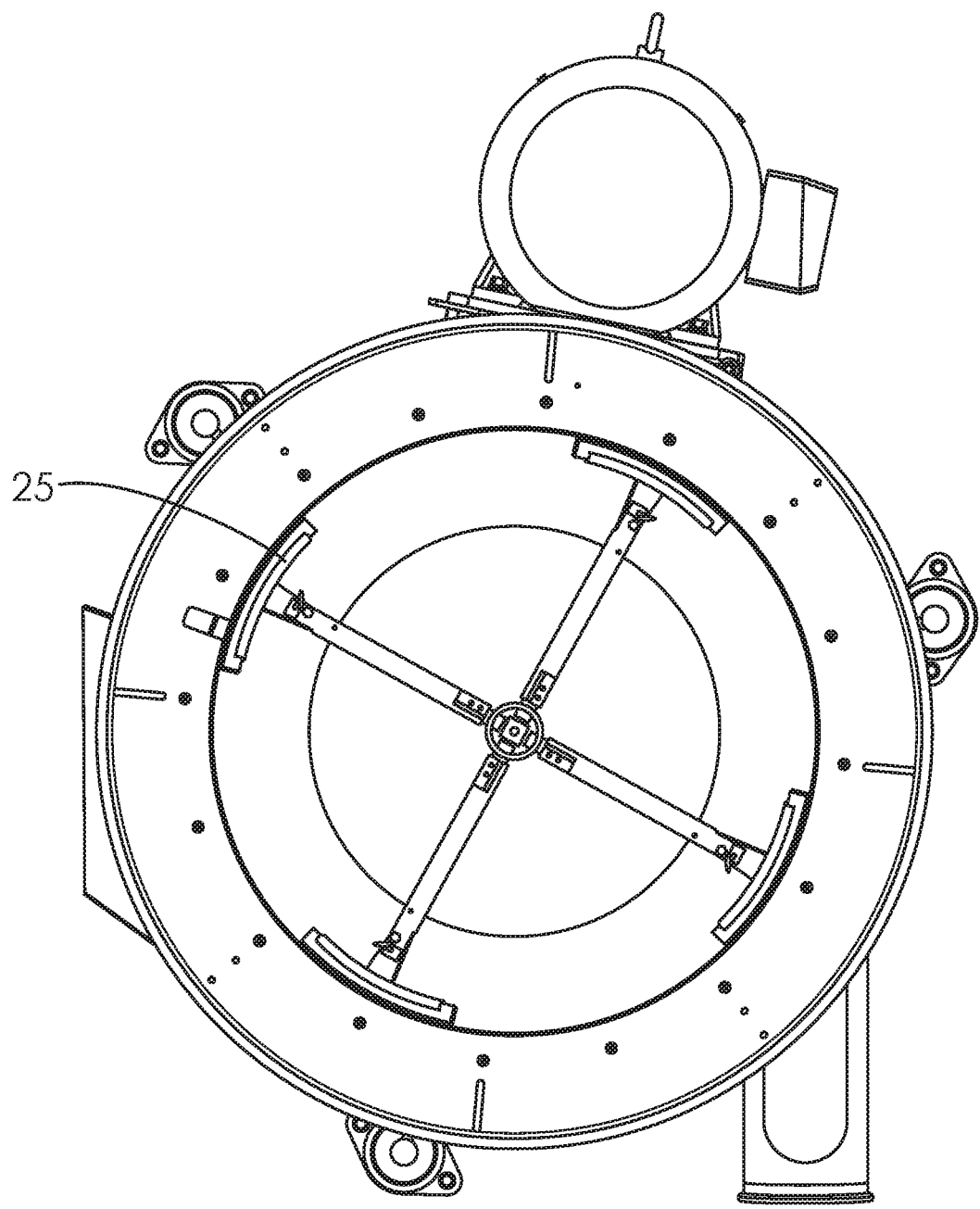
FIG. 5 is a top perspective of the inside of the solid-liquid separator in accordance with an embodiment.

The wiper assembly 24 comprises wiper blades 25, an elongated cone 26, and shaft 27. FIG. 5 shows the wiper blades 25 in accordance with an embodiment. The solid-liquid mixture enters the shaft 27 via the inlet 28 and travels vertically down the shaft 27 toward the bottom wall 18 of the basket and filter assembly 16. The solid-liquid mixture then exits the shaft 27 through a port located at the bottom of the shaft 27 below the elongated cone 26 and flows into the basket and filter assembly 16. When the wiper assembly 24 rotates, the elongated cone 26 directs the solid-liquid mixture exiting the port downward along the bottom wall 18 and toward the filter 17. The elongated cone 26 optimizes contact of the solid-liquid mixture with the filter 17 resulting in enhanced separation of the solid and liquid phases. The rotation of the wiper blades 25 relative to the rotation of the basket and filter assembly 16 facilitates the movement of solids vertically up the filter 17 to allow for discharge of the solid phase.

A contour tank 29 surrounds and merges with the upper end of the tank 12. After the solid phase travels vertically up the filter 17 by action of the wiper blades 25, the greater width of the contour tank 29 allows the solid phase to accumulate before discharging through the solid discharge outlet 30. The scrapers 31 located in the area enclosed by the contour tank 29 and attached to the top of the basket and filter assembly 16 direct solids toward the solid discharge outlet 30.

FIG. 1 shows an embodiment of a tank cover assembly 32 used to seal the solid-liquid separator 10. The tank cover assembly 32 comprises a tank cover 33, vent cover assembly 34, and adaptor cover 35. The adaptor cover 35 is located at the center of the tank cover assembly 32 and secures the tank cover assembly 32 to the shaft 27 of the wiper assembly 24. The inlet 28 is formed by the portion of the shaft 27 that extends above the adaptor cover 35. The tank cover 33 spans the entire open end of the solid-liquid separator and is secured by a clamp 36 to the contour tank 29. When the tank cover assembly 32 is assembled, the vent cover assembly 34 is positioned on top of a portion of the tank cover 33. The vent cover assembly 34 comprises a vent section 37 and solid section 38, which are equally sized and fastened together via hinges 39 to form an annulus in an embodiment.

Figure 4:
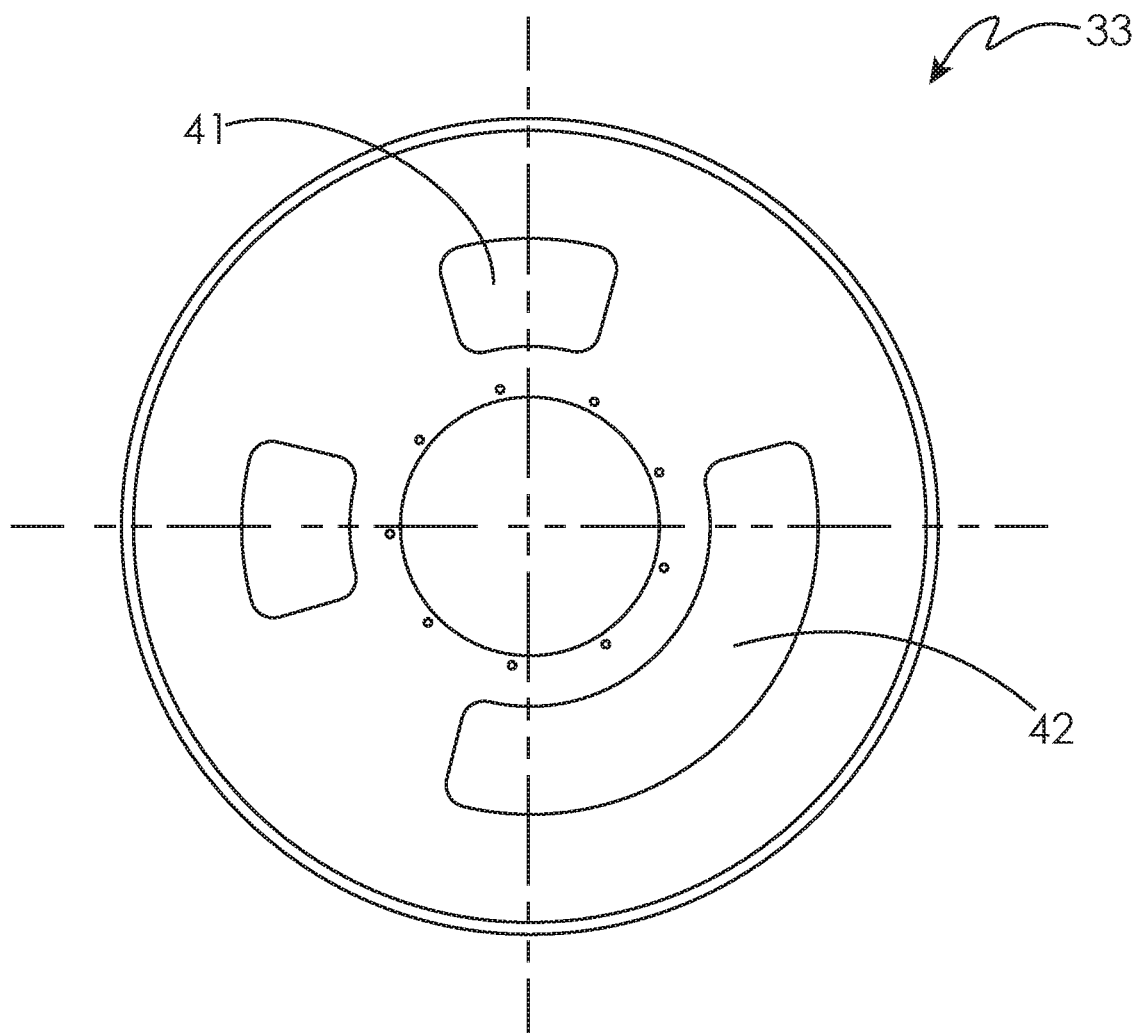
FIG. 4 is a top perspective of the tank cover in accordance with an embodiment.

FIG. 4 illustrates an embodiment of a tank cover 33 that allows for air infiltration and access into the solid-liquid separator 10 when the vent cover assembly 34 is disposed thereon. The vent section 37 of the vent cover assembly 34 includes air vents 40. The tank cover 33 comprises cutouts 41 and an opening 42. When the tank cover assembly 32 is assembled, the cutouts 41 can align with the air vents 40 of the vent section 37. In one embodiment, the vent cover assembly 34 can be rotated 180 degrees. During operation of the solid-liquid separator 10, the vent cover assembly 34 can be rotated so that the air vents 40 and cutouts 41 align for maximum air infiltration. The alignment can also be adjusted so that the air vents 40 are partially opened or in a closed position. The vent cover assembly 34 can also be aligned so that the solid section 38 can be opened via hinges 39 to allow access to the inside of the solid-liquid separator 10 through the opening 42 in the tank cover 33.

The embodiments described herein provide an efficient and cost effective method for separation of solid and liquid phases in a solid-liquid mixture. Additionally, the solid-liquid separator enables the operator to easily adjust the machine according to the solids content of the solid-liquid mixture. The embodiments described herein help reduce the amount of organic material in treatment lagoons, odors in storage and treatment facilities, solids build-up in primary lagoons, frequency of lagoon sludge removal, and potential surface water and groundwater pollution. Furthermore, the embodiments described herein provide a method for producing a solid phase capable of being used for bedding materials, animal feed supplements, composts, and soil amendments.

While the embodiments have been illustrated and described in detail in the drawings and foregoing description, the same is to be considered as illustrative and not restrictive in character, it being understood that only certain embodiments have been shown and described and that all changes and modifications that come within the spirit of the embodiments are desired to be protected.

The invention claimed is:

1. A solid-liquid separator for separating a solid phase in a solid-liquid mixture, comprising:
   a leg and tank assembly, comprising a tank;
   a basket and filter assembly housed coaxially about an upright axis within the tank, wherein the basket and filter assembly comprises a filter providing filtration of the solid-liquid mixture and a basket bottom wall;
   a wiper assembly housed coaxially about the upright axis within the basket and filter assembly, wherein the wiper assembly comprises wiper blades and a cone that facilitate separation of the solid phase and liquid phase, and wherein the cone has a cone axis that is coaxial with the upright axis and directs the solid-liquid mixture downward along the basket bottom wall of the basket and filter assembly toward the filter; and
   a spindle assembly for controlling separate rotation of the basket and filter assembly and the wiper assembly about the upright axis.

2. The solid-liquid separator of claim 1, wherein the leg and tank assembly further comprises at least one leg.

3. The solid-liquid separator of claim 1, wherein the tank comprises an upper end, a side wall, and a tank bottom wall that form a vessel comprising a void space for collecting the liquid phase.

4. The solid-liquid separator of claim 1, wherein the filter comprises a membrane liner.

5. The solid-liquid separator of claim 1, wherein the wiper blades are constructed and arranged to facilitate movement of the solid phase vertically up the filter of the basket and filter assembly and movement of the liquid phase through the filter.

6. The solid-liquid separator of claim 3, wherein the tank further comprises a primary liquid discharge outlet extending exterior to the side wall.

7. The solid-liquid separator of claim 6, wherein the tank further comprises a secondary liquid discharge outlet extending exterior to the side wall.

8. The solid-liquid separator of claim 7, wherein the secondary liquid discharge outlet extends exterior to the side wall above the primary liquid discharge outlet.

9. The solid-liquid separator of claim 8, wherein the secondary liquid discharge outlet extends exterior to the side wall initially horizontally, then bends 90 degrees downward to connect with the primary liquid discharge outlet.

10. The solid-liquid separator of claim 3, further comprising a contour tank that surrounds and merges with the upper end of the tank.

11. The solid-liquid separator of claim 10, wherein the contour tank comprises a solid discharge outlet.

12. The solid-liquid separator of claim 11, wherein the basket and filter assembly further comprises a plurality of scrapers that are enclosed by the contour tank and that are constructed and arranged to push solids toward the solid discharge outlet.

13. The solid-liquid separator of claim 3, further comprising a tank cover assembly that seals the upper end of the tank.

14. The solid-liquid separator of claim 13, wherein the tank cover assembly comprises:
a vent cover assembly, comprising air vents; and
a tank cover, comprising cutouts.

15. The solid-liquid separator of claim 14, wherein the vent cover assembly is constructed and arranged to be rotated relative to the tank cover so that the air vents may be partially opened, closed, or aligned with the cutouts.

16. The solid-liquid separator of claim 14, wherein the tank cover assembly further comprises an inlet at the top of the tank cover assembly.

17. The solid-liquid separator of claim 1, further comprising a motor coupled to the spindle assembly so as to drive the separate rotation of the basket and filter assembly and the wiper assembly about the upright axis.

18. The solid-liquid separator of claim 1, wherein the wiper assembly rotates at a higher rate than the basket and filter assembly.

19. The solid-liquid separator of claim 1, wherein the wiper assembly rotates at a lower rate than the basket and filter assembly.

* * * * *